Dec. 25, 1951  J. M. WILSON  2,579,716
CONDITION CONTROLLING APPARATUS
Filed June 7, 1948
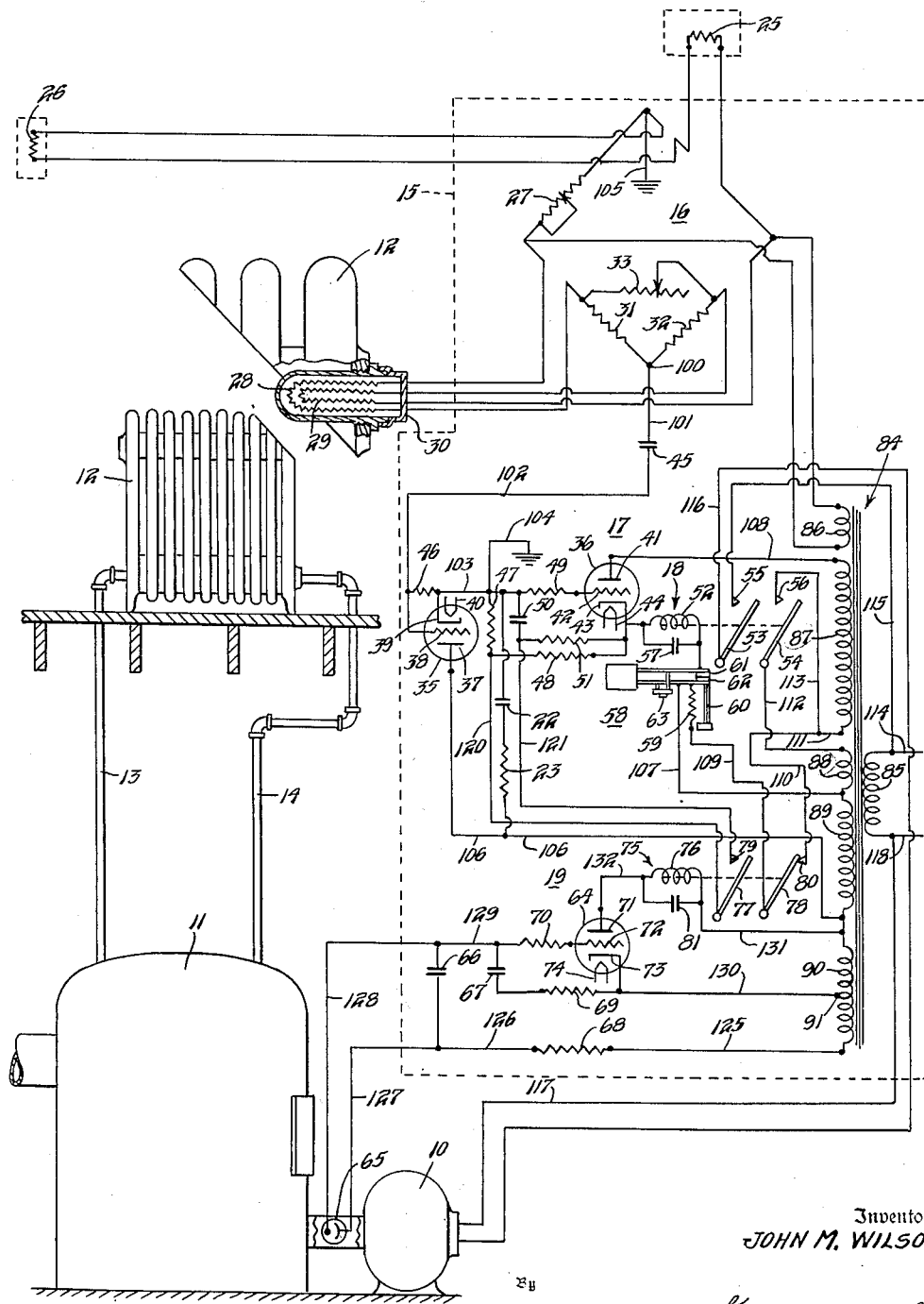
Inventor
JOHN M. WILSON
George H. Fisher
Attorney Patented Dec. 25, 1951

2,579,716

UNITED STATES PATENT OFFICE 2,579,716

CONDITION CONTROLLING APPARATUS

John M. Wilson, Minneapolis, Minn., assignor to Minneapolis-Honeywell Regulator Company, Minneapolis, Minn., a corporation of Delaware Application June 7, 1948, Serial No. 31,482

11 Claims. (Cl. 236—78)

The present invention is concerned with an improved condition control apparatus. More particularly, it is directed to providing an electronic amplifier which has means provided therewith for changing the operating differential between the effective operating values of the control signals.

In many applications of condition control, it is desired to operate a relay which in turn is effective to energize condition changing means, such as a fuel burner or the like. These relays are generally so constructed that the values of current flow through the relay necessary to energize the same is greater than the value of current necessary to maintain that relay energized. This will mean that there is a differential between "pull-in" and "drop-out" current. This differential, speaking in terms of temperature control, may mean that there will be several degree difference between a temperature condition calling for heat and which will cause energization of the relay and on which indicates no further need for heat and will cause deenergization of the relay. The present invention is concerned with providing, in an amplifier which is used to energize the control relay, circuit means for decreasing the effective operating differential once the control relay has been energized by the amplifier. Such a provision as this makes it possible to maintain the controlled condition, such as temperature, within very close limits and still maintain stability within the amplifier.

It is therefore an object of the present invention to provide in an amplifier for energizing a condition control relay, means for changing the operating differential of the control signals which are causing operation of the control relay.

A further object of the present invention is to provide in an electronic amplifier for driving a relay a pair of electron discharge devices coupled in series with means for varying the couplings between the discharge devices to change the operating differential between the control signal necessary to energize the control relay and deenergize the control relay.

A still further object of the present invention is to provide in an electronic amplifier for driving a control relay a switching device which is operated by means independent of the control relay and which is effective to change the operating differential between the control signals necessary to energize the control relay and to deenergize the control relay.

Still another object of the present invention is to provide with a temperature control apparatus, which is effective to energize a fuel burner control relay when the control signal of the apparatus is of a first value and deenergize the relay when of a second value, a device responsive to proper operation of the burner for decreasing the operating differential between the first and second values in the electronic amplifier which is used to energize the relay.

These and further objects and advantages will be apparent upon a consideration of the specification that follows, the claims, and the appended drawing.

The single figure of the drawing illustrates the control circuits of the invention.

The single figure shows the present invention as applied to a temperature control apparatus. The numeral 10 represents an appropriate fuel burner of any desired type which is adapted when energized to supply heat to the fire box of the furnace 11. A radiator 12 has heat conducted thereto from the furnace 11 by means of pipes 13 and 14. Controlling the operation of the fuel burner 10 is a control device or apparatus located within an enclosure 15 and which consists of a temperature control bridge 16 and an amplifier 17 whose input is from the control network 16 and which is operative to energize or deenergize a burner control relay 18. The burner control relay 18 is operative when energized to initiate operation of the fuel burner 10. A flame detector 19 is provided to indicate when the fuel burner 10 is operating properly. When the burner is operating properly, the detector 19 will be effective to prevent a shutdown of the control apparatus before the control network 16 indicates that there is no need for further operation of the burner 10.

The control network 16 is basically a Wheatstone bridge type of control network and consists of a room temperature responsive resistor 25, a compensating resistor 26 which may be responsive to attic or outdoor temperature, a calibrating potentiometer 27, radiator temperature responsive resistors 28 and 29 located in a housing 30 which is threadedly engaged in the end portion of the radiator 12 which is shown in exploded view, a pair of fixed resistors 31 and 32, and an authority control potentiometer 33 which is effective to vary the controlling effect of the radiator temperature responsive resistors 28 and 29. All of the temperature responsive resistors have a positive temperature coefficient of resistance.

The amplifier 17 consists of a pair of electron discharge devices 35 and 36. The discharge device 35 is in the form of a triode which consists of an anode 37, a control electrode 38, and a cathode 39 which is heated to be electron emissive by a filament type of heater 40. The discharge device 36 consists of an anode 41, a control electrode 42, and a cathode 43 which is heated to be electron emissive by a filament heater 44. Located on the input to discharge device 35 is a coupling condenser 45 and a grid resistor 46. Located in the output circuit of the triode 35 are a pair of load resistors 47 and 48. A resistor 49 is provided as a grid current limiting resistor for the triode 36 while a condenser 50 and resistor 51 are associated with the biasing circuit for the triode 36. A condenser 22 and a resistor 23 are also associated with the input of triode 36.

The relay 18 may be seen to consist of a relay winding 52 which is operative when energized to move a pair of switch blades 53 and 54 into engagement with their associated switch contacts 55 and 56 respectively. A condenser 57 is connected in parallel with the relay winding 52 to by-pass the alternating current flowing in the relay energizing circuit.

The numeral 58 indicates generally a safety switch device which consists of a heater 59 which is operative after a predetermined time delay to warp a bimetal element 60 out from under a pair of switch contacts 61 and 62 so that the contacts may open. A manual reset lever is indicated at 63.

The flame detector 19 is the equivalent of the flame detector disclosed in my Patent No. 2,448,503, issued August 31, 1948. The flame detector 19 consists of an electron discharge device 64 whose current flow is controlled primarily by a photocell 65. Associated with the input to the triode 64 are a pair of condensers 66 and 67 and a pair of resistors 68 and 69. A resistor 70 is provided for grid current limiting purposes on the input of the triode 64. The triode 64 consists of an anode 71, a control electrode 72, and a cathode 73 which is heated to be electron emissive by an appropriate filament type of heater 74. Energized by the current flow through the triode 64 is a control relay 75 which consists of a relay winding 76 which is operative when energized to move a pair of switch blades 77 and 78 so that the switch blade 77 will engage its associated switch contact 79 and switch blade 78 will disengage from its associated switch contact 80. A condenser 81 functions to by-pass the alternating current past the relay winding 76.

Supplying power to the subject control apparatus is a transformer 84 which has a primary winding 85 which may be connected to any suitable source of power and a plurality of secondary windings. The numeral 86 indicates the secondary winding associated with the temperature control network 16 while the numerals 87, 88 and 89 indicate the secondary windings associated with the control amplifier 17. The numeral 90 indicates the secondary winding that is associated with the flame detector 19 and the secondary 90 is tapped at 91.

Operation

In considering the operation of the subject apparatus, assume first that the apparatus is in the condition shown in the drawing with the relays 18 and 75 in the deenergized position. This will mean that the triodes 36 and 64 are not conducting and there will be no signal from the control network 16 calling for operation of the burner 10. The triode 36 will be effectively nonconducting because of the fact that the control electrode 42 of the triode 36 is biased to be negative with respect to the cathode 43 on the half cycle of the alternating power supply when the anode 41 is positive or on the normally conductive half cycle of the power supply. This phasing may readily be seen when it is noted that the anode 41 is directly connected to the upper terminal of the secondary section 87 by a conductor 108, the cathode 43 is connected to the lower terminal of secondary section 87 by a circuit that may be traced from cathode 43 through winding 52, switch contacts 61 and 62, heater 59, conductor 109, switch blade 78, switch contact 80, and conductors 110 and 111, and the control electrode 42 is connected to the lower terminal of secondary section 89 through resistor 49, condenser 22, resistor 23, and conductor 106. The upper terminal of secondary 89 is connected to the lower terminal of secondary 87 by a circuit that may be traced from the upper terminal of secondary 89 through conductor 107, heater 59, conductor 109, switch blade 78, switch contact 80 and conductors 110 and 111 to the lower terminal of secondary 87. This will mean that the triode 36 will remain effectively nonconductive until some biasing voltage is applied to the control electrode 42 which will overcome this fixed A. C. bias.

Next assume that the room temperature responsive resistor 25 has cooled off to such an extent that the control network has become unbalanced and is calling for a need for operation of the burner 10. This will mean that there will be a voltage applied to the input of the amplifier 17 or to the input of the triode 35. This control signal may be traced from the bridge output terminal 100 through conductor 101, condenser 45, conductor 102, grid resistor 46, conductor 103, and ground 104 back to ground 105 on the other output terminal of the bridge 16. The output voltage from the bridge 16 will be an alternating current voltage and when it is indicating a need for operation of the burner the phase of that output voltage will be such as to cause the triode 35 to become conductive. The triode 35 is also supplied with alternating current which means the phase of the input signal must make the grid positive on the conducting half cycle of the power supply. The voltage supply or current flow path for the triode 35 may be traced from the lower terminal of the secondary 89 through conductor 106, anode 37, cathode 39, conductor 103, resistor 47, resistor 48, relay winding 52, switch contacts 61 and 62 and conductor 107 back to the upper terminal of the secondary section 89. The current flow through this last traced circuit will not be sufficient by itself to energize the relay 18 but it will be sufficient to apply a further biasing voltage to the input of the triode 36. The current flow through the resistors 47 and 48 will be in such a direction as to put a positive voltage on the upper termnial of the resistor 47 and a negative voltage on the right hand terminal of the resistor 48 and this will mean that this biasing voltage will charge the condenser 50 to be positive on the upper terminal and negative on the lower terminal. With this positive voltage on the upper terminal of the condenser 50 there will be a positive voltage applied to the control electrode 42 of the triode 36 through the limiting resistor 49 and this positive voltage will overcome the A. C. bias and make it possible for the triode 36 to be conductive on the positive half cycle of the power supply. The current flow through the triode 36 may be traced from the upper terminal of the secondary 87 through conductor 108, anode 41, cathode 43, relay winding 52, switch contacts 61 and 62, safety switch heater 59, conductor 109, switch blade 78, switch contact 80, conductor 110 and conductor 111 back to the lower terminal of the secondary section 87. It will be noted that this last traced circuit included the relay winding 52 and the current flow in this last traced circuit will be sufficient to energize the relay 18 so that the winding 52 will move the switch blades 53 and 54 into engagement with their associated contacts 55 and 56. When the switch blade 54 engages switch contact 56, a holding circuit for the relay 18 is established independent of the switch blade 78 and contact 80 of the relay 75 and this holding circuit may be traced from the upper terminal of the secondary section 87 through conductor 108, anode 41, cathode 43, relay winding 52, switch contacts 61 and 62, conductor 107, secondary section 88, conductor 112, switch blade 54, switch contact 56, and conductors 113 and 111 back to the lower terminal of the secondary section 87. When the switch blade 53 engages switch contact 55 an energizing circuit is completed to the burner 10 and this circuit may be traced from the input power line 114 through conductor 115, switch contact 55, switch blade 53, conductor 116, burner 10, and conductor 117 back to the other input power line 118. With the completion of the last traced circuit the burner 10 should be in operation. The safety switch heater will still be in an energizing circuit that may be traced from the lower terminal of secondary section 88 through conductor 107, heater 59, conductor 109, switch blade 78, contact 80, conductors 110 and 113, switch contact 56, switch blade 54, and conductor 112 to the upper terminal of secondary section 88.

If the burner 10 is operating properly, the flame detector 19 will be operative in a manner fully described in my above-mentioned copending application. It will be sufficient to say here that when a flame is sensed by the photocell 65 a pulsating unidirectional current will flow in a circuit that may be traced from the lower terminal of secondary 90 through conductor 125, resistor 68, conductors 126 and 127, photocell 65, conductors 128 and 129, condenser 67, resistor 69, and conductor 130 to tap 91 of secondary 90. This current flow will put a charge on condenser 67 so that its upper terminal is plus and its lower terminal is negative. This will bias the tube 64 into conduction and the tube current flow will be sufficient to energize relay 75. This tube current flow circuit may be traced from the upper terminal of secondary winding 90 through conductor 131, relay 75, conductor 132, anode 71, cathode 73, and conductor 130 to tap 91 of secondary 90. When the condenser 67 is not being charged by the rectifying action of photocell 65, the control electrode 72 of tube 64 is biased negatively with respect to the cathode 73 and this biasing circuit may be traced from the control electrode 72 through resistor 70, conductor 129, condenser 66, conductor 126, resistor 68, and conductor 125 to the lower terminal of secondary 90. Flame detector 19 will be operative only when there is a flame present in the furnace 11 and will not be operated falsely in the event there should be a short or open circuit associated with the photocell 65 because of the rectifying properties of the photocell. When the flame detector 19 is operative the switch blade 78 will be moved out of engagement with the associated contact 80 and will result in the breaking of the circuit to the safety switch heater 59 traced above. With the opening of the circuit to the safety switch heater there will be no further heat applied to the bimetal 60 and the bimetal will maintain the contacts 61 and 62 in the engaged position.

When the switch blade 77 moves into engagement with switch contact 79, the resistor 48 is effectively connected in parallel with the resistor 51 by a circuit that may be traced from the left hand terminal of the resistor 48 through conductor 120, switch blade 77, switch contact 79, and conductor 121 back to the left hand terminal of resistor 51. When the resistor 48 is connected in parallel with the resistor 51 the biasing effect of the condenser 50 upon the input of triode 36 will be decreased. One way of looking at this decrease in biasing voltage on the triode 36 is that with the resistor 48 in parallel with the resistor 51 there will be a decrease in the amount of resistance in the conductive circuit of the triode 35 and this will mean that there will be less voltage drop across these resistors to bias the condenser 50 and a greater voltage drop across the triode 35 with the result that the condenser 50 will not be charged to the value that it was prior to the time that the switch blade 77 engaged switch contact 79. Another way of looking at this decrease in the biasing effect of the condenser 50 on the triode 36 is that the condenser 50 has a discharging circuit which, before switch blade engages switch contact 79, may be traced from the upper terminal of the condenser 50 through resistor 47, resistor 48, and resistor 51 back to the lower terminal of the condenser 50. Upon the engaging of switch blade 77 with switch contact 79 and the paralleling of the resistor 48 and the resistor 51 a new discharging circuit is established for the condenser 50 which may be traced from the upper terminal of condenser 50 through the resistor 47, conductor 120, switch blade 77, switch contact 79, and conductor 121 back to the lower terminal of the condenser 50. The combined effect of the change in the resistance in the conducting circuit of the triode 35 and the decrease in the amount of resistance in the discharge circuit of the condenser 50 results in a decrease of the amount of positive bias supplied to the triode 36.

The need for this decrease in the amount of bias on the triode 36 will be understood when it is realized that the burner control relay 18 is of the type which requires a higher current flow to become energized than is required to maintain the relay energized. This will mean that the output voltage from network 16 will be of a first value which will energize the relay 18 and will be of a second value when it is no longer sufficient to maintain the relay energized. The difference in the values of the first and second voltages may represent a large difference between the actual temperature condition which effects the energization of the burner relay and deenergization of the same. Obviously the positioning of the amplifier in series between the output of the network 16 and the relay 18 serves to cut down this operating differential considerably but, the operating differential may be even further reduced by providing a circuit as discussed above to reduce the effective operating differential between the pull-in and drop-out voltages required of the control network 16 to energize and deenergize the burner relay. With such an arrangement the temperature sensed by the control network 16 may be held within very close limits. This further permits the use of a smaller amplifier which does not require high amplification in order to maintain close control of the pull-in and drop-out signals of the burner relay. It is desirable not to cut this operating differential down until it is certain that the apparatus is functioning properly and will be maintained in operation until the control network 16 indicates there is no need for further operation of the burner 10. This is one reason for providing the flame detection relay with a contact which may be used to cut down this differential. Another reason for using a relay separate from the burner control relay 18 is that if this burner relay 18 were used there would be a tendency for the differential change occurring at the instant the relay pulled in to cause it to drop out again and a chattering would result as the relay oscillated between "pull-in" and "drop-out" positions. This does not occur when the flame detection relay operates the differential change switch.

With the burner 10 in operation there will be heat supplied to the furnace 10 and this heat will be conducted by any appropriate medium through the pipes 13 and 14 to the radiator 12. As mentioned above, located in the end of the radiator 12, as shown in exploded view, is a container 30 which has therein a pair of temperature sensing resistors 28 and 29. The temperature sensing resistor 28 is located near the surface of the container 30 so as to be able to respond quickly to the changes in temperature of the heating fluid in the radiator 12. The resistor 29 is located inside the resistor 28 and is actually a lagged resistor so that normally as heat is applied to the radiator 12 this will first be sensed by the resistor 28 and later sensed by the resistor 29. This will mean that with the temperature of the heating medium in the radiator 12 increasing, the resistance of resistor 28 will be increasing before the resistance of resistor 29 increases. As the lagged and unlagged resistors are connected in opposite legs of the control network 16 there will be an anticipation of the amount of heat needed in order to bring the control network 16 back to the balanced or no heat demand condition. The length of time it takes to bring this back to balance will be, of course, dependent on the temperature conditions sensed by room resistor 25 and attic or outdoor compensating resistor 26. Obviously, when the lagged and unlagged resistors are of the same value or temperature they will not be unbalancing the control network. When there is no longer an indication for the need for operation of the burner 10 as indicated by the network 16 there will be no voltage on the output terminals of the network 16 to cause deenergization of the triode 35 and the subsequent biasing of the triode 36 so that now the triode 36 will be nonconductive. The triode 36 will be nonconductive since, as pointed out above, the control electrode 42 is effectively connected to a negative point in the power source with respect to the cathode 43 by way of condenser 22 and resistor 23. With only the A. C. bias voltage on the triode 36 the triode will become nonconductive and the relay 18 will become deenergized. When the relay 18 becomes deenergized, the switch blades 53 and 54 will move out of engagement with their associated switch contacts 55 and 56 and this will result in the deenergization of the burner 10. With the deenergization of the burner 10 there will no longer be a flame present in the furnace 11 and this will mean that the photocell 65 will no longer detect the flame and the flame detection relay will become deenergized so that switch blade 77 moves out of engagement with its associated switch contacts 79 and the blade 78 moves into engagement with its switch contact 80. The apparatus is now in the deenergized position and is ready for another operating cycle.

In assuming a constant temperature condition in the room wherein is located the radiator 12 and the temperature responsive resistor 25 it will be seen that the radiator 12 will be dissipating heat into the room and will begin to cool. This cooling will be detected first by the unlagged resistor 28 and its change in resistance will be in a direction calling for additional heat and the control network will become unbalanced to initiate another operating cycle of the burner. The effect of the compensating resistor is to give some measure of the outdoor temperature conditions or weather and, as mentioned above, may be located in an attic or in some other enclosure where it will give the desired measure of outdoor temperature. In the event that the outdoor temperature should drop, this compensator will be effective to unbalance the control network and initiate operation of the burner 10 in the same manner as a drop in room temperature.

The adjustment of the control network may be made by adjusting the potentiometer 27 and the controlling effect of the lagged and unlagged resistors 28 and 29 may be controlled by varying the potentiometer 33. It will be noted that the adjustment of the potentiometer 33 will not act to unbalance the control bridge by itself and merely serves to vary proportionally the amount of resistance that will be added into the control network by the lagged and unlagged resistors 28 and 29.

In the event there should be a flame failure either while the system is in operation or is on the starting cycle there will be a circuit completed to the safety switch heater 59 and this circuit is as traced above. With continued energization of the safety switch heater 59 the bimetal 60 will warp out from under the switch contacts 61 and 62 and these contacts will open to break the plate circuit of the discharge device 36 and with the breaking of this circuit the relay 18 will become deenergized and switch blades 53 and 54 will move out of engagement with their associated contacts 55 and 56. The apparatus will remain in the shutdown position until such time as the manual reset is depressed and the contacts 61 and 62 are again engaging. When the contacts 61 and 62 are again engaging the apparatus will be in a condition to go through another operating cycle whose length will be dependent upon the temperature conditions existing in the control network 16.

From the foregoing it may be seen that I have provided an electronic amplifier for use in a condition control apparatus which is operative to energize a control relay which has a differential current flow between "pull-in" and "drop-out" and have provided in that amplifier an adjustment for decreasing the operating differential between the signal required to "pull-in" the relay and "drop-out" the relay when it is assured that the apparatus controlled by that control relay is operating correctly. While I have shown my invention applied to a temperature control apparatus and while well applied here, it will be obvious to those skilled in the art that there are many applications for this type of control. I therefore intend to be limited solely by the scope of the appended claims in which I claim:

1. In combination, an electronic amplifier including a pair of interconnected electron discharge devices, a relay, a source of control signal, means operatively interconnecting said source, said amplifier and said relay in the order named, means including said source for causing said amplifier to energize said relay when the control signal is of a first value and deenergize said relay when of a second value, and circuit means including a direct current control signal coupling circuit connected between said devices and switching means for altering the connection between said discharge devices for automatically reducing the operating differential between said first and second values of said control signal.

2. In combination, an electronic amplifier including first and second electron discharge devices which are interconnected, a condenser connected between said first and second discharge devices and adapted to be charged by the current flowing in said first discharge device and to vary the current flow through said second device, and a discharge circuit for said condenser; a relay; a source of control signal; means operatively interconnecting said source, said amplifier and said relay in the order named; means including said source for causing said amplifier to energize said relay when the control signal is of a first value and deenergize said relay when of a second value; and circuit means including a condition responsive switch independent of said relay for automatically varying said discharge circuit and the discharge rate of said condenser to vary the operating differential between said first and second values of said control signal.

3. In combination; an electronic amplifier including operatively interconnected first and second electron discharge devices, a condenser connected between said first and second discharge devices and adapted to be charged by an amount proportional to the current flowing in said first device and to vary the current flow through said second device, a pair of resistors connected as a discharge circuit for said condenser, and a third resistor; a relay; a source of control signal; means operatively interconnecting said source, said amplifier, and said relay in the order named; means including said source for causing said amplifier to energize said relay when the control signal is of a first value and deenergize said relay when of a second value; and automatically operated switch means for connecting said third resistance in circuit with one of said pair of resistors to change the operating differential between said first and second values of said control signal.

4. In combination; an electronic amplifier comprising first and second electron discharge devices, a condenser, a first resistor, means connecting said condenser and said resistor in series in current flow controlling relation to said second discharge device, means connecting said first discharge device in circuit with said condenser to vary the current flow through said second discharge device, a pair of resistors connected in discharge relation to said condenser; a relay; a source of control signal; means operatively interconnecting said source, said amplifier, and said relay in the order named; means including said source for causing said amplifier to energize said relay when the control signal is of a first value and deenergize said relay when of a second value; and switch means automatically connecting said first resistor in parallel with one of said pair of resistors to change the operating differential between said first and second values of said control signal.

5. In a temperature control apparatus, a current responsive relay for energizing heating means, an amplifier including a pair of operatively interconnected electron discharge devices, a source of control signal adapted to indicate the need for operation of the heating means, means including said amplifier and said source for causing a first current flow to flow through said relay when said source indicates a need for heat and a second current flow when said source indicates no further need for heat, and means operative as an incident to energization of said relay to alter the connection between said discharge devices to change the differential between the control signals indicating a need for heat and no need for heat, said last named means comprising a resistor connected in parallel with said connection by switching means.

6. In a temperature control apparatus, a current responsive relay for energizing heating means; an electronic amplifier including first and second electron discharge devices which are operatively interconnected, a biasing condenser connected between said first and second discharge devices and adapted to be charged by current flowing in said first discharge device and to vary the current flow through said second device, and a discharge circuit for said condenser; a source of control signal adapted to indicate the need for operation of the heating means; means including said amplifier and said source for causing a first current flow to flow through said relay when said source indicates a need for heat and a second current flow when said source indicates no further need for heat; and means operative as a result of energization of said relay to alter the discharge circuit for said condenser and thereby the discharge rate of said condenser to change the differential between the control signals indicating a need for heat and no heat.

7. In a temperature control apparatus; a current responsive relay for energizing heating means; an electronic amplifier including first and second electron discharge devices which are operatively interconnected, a condenser connected between said first and second discharge devices and adapted to be charged by the current flowing in said first device and to vary the current flow through said second device, a pair of resistors connected as a discharge circuit for said condenser, and a third resistor; a source of control signal adapted to indicate the need for operation of the heating means, means including said amplifier and said source for causing a first current flow to flow through said relay when said source indicates a need for heat and a second current flow when said source indicates no further need for heat, and switch means operated by means rendered operative as an incident to energization of said relay for connecting said third resistor in circuit with one of said pair of resistors to change the differential between the control signal indicating a need for heat and no heat.

8. In a temperature control apparatus; a current responsive relay for energizing heating means; an electronic amplifier comprising first and second electron discharge devices, a condenser, a first resistor, means connecting said condenser and said resistor in series in current flow controlling relation to said second discharge device, means connecting said first discharge device in circuit with said condenser to vary the controlling effect of said condenser on the current flow of said second discharge device, and a pair of resistors connected in discharge relation to said condenser; a source of control signal adapted to indicate the need for operation of heating means; means including said amplifier and said source for causing a first current flow to flow through said relay when the source indicates a need for heat and a second current flow when said source indicates no further need for heat; and switch means operative upon proper operation of the heating means for connecting said third resistor in circuit with one of said pair of resistors to change the operating differential between the control signals indicating a need for operation of the heating means and the signal indicating no need for operation of the heating means.

9. In a burner control apparatus, a burner relay movable to and from an energized position, an impedance element having an appreciable temperature coefficient of impedance and subjected to a temperature condition indicative of the need for operation of the burner, electronic amplifier means having coupling means between amplifying stages thereof operative upon the value of said temperature condition dropping below a predetermined value to cause said relay to be energized sufficiently to cause it to move to its energized position, said coupling means comprising a resistance circuit in parallel with a condenser, and switch means operative as a result of energization of said relay for changing said resistance circuit and so affecting said coupling means in said electronic amplifier as to decrease by a fixed predetermined amount the extent to which said temperature condition must rise to cause said relay to move from its energized position.

10. In combination, an electronic amplifier, a relay, a source of control signal, means operatively interconnecting said source, said amplifier and said relay in the order named, means including said source for causing said amplifier to energize said relay when the control signal is of a first value and deenergize said relay when of a second value, and circuit means connected between two amplifying stages within said amplifier for automatically changing the operating differential between said first and second values of said control signal by a predetermined amount upon energization of said relay, said circuit means comprising a signal coupling circuit through which flows the amplified control signal and switch means for modifying said circuit.

11. In combination, an electronic amplifier comprising first and second electron discharge devices which are interconnected, said first discharge device having a direct current impedance circuit in series therewith adapted to vary the operation of said second discharge device in accordance with the direct current from said first device flowing in said circuit, a relay, a source of control signal, means operatively interconnecting said source, said amplifier and said relay in the order named, means including said source for causing said amplifier to energize said relay when the control signal is of a first value and to deenergize said relay when of a second value, and circuit means including a condition responsive switch for automatically altering said impedance circuit and its effect on said second discharge device to reduce the operating differential between said first and second values of said control signal.

JOHN M. WILSON.

REFERENCES CITED

The following references are of record in the file of this patent:

UNITED STATES PATENTS

| Number | Name | Date |
| --- | --- | --- |
| 2,420,578 | Wilson | May 13, 1947 |
| 2,425,733 | Gille et al. | Aug. 19, 1947 |